United States Patent
Yamaguchi

[11] Patent Number: 6,163,084
[45] Date of Patent: Dec. 19, 2000

[54] CABLE BRANCHING UNIT

[75] Inventor: Shohei Yamaguchi, Tokyo, Japan

[73] Assignee: NEC Corporation, Tokyo, Japan

[21] Appl. No.: 09/245,545

[22] Filed: Feb. 5, 1999

[30] Foreign Application Priority Data

Feb. 9, 1998 [JP] Japan .................................. 10-041038

[51] Int. Cl.[7] ................................ H02J 1/00; H02J 3/00; H02J 3/14
[52] U.S. Cl. ............................................................. 307/38
[58] Field of Search ................................ 174/33; 307/11, 307/18, 38, 39, 100, 129

[56] References Cited

U.S. PATENT DOCUMENTS 3,644,787  2/1972  Hamilton .................................. 317/16
5,532,478  7/1996  Kogure .............................. 250/227.24

*Primary Examiner*—Stephen W. Jackson
*Assistant Examiner*—Andre Henry
*Attorney, Agent, or Firm*—Ostrolenk, Faber, Gerb & Soffen, LLP

[57] ABSTRACT

A cable branching unit which enables the exchange of signals through normal cables without suspending the power supply even when a short mode fault is caused in a cable branching from the cable branching unit. The cable branching unit branches a first cable into a second and a third cable and comprises a band pass filter for extracting a control signal multiplexed among signals transmitted from the first land station through the first cable, and a relay short circuits, to a ground, one or both of the cable connected to the second land station and the cable connected to the third land station, according to the control signal extracted by the band pass filter.

26 Claims, 3 Drawing Sheets

CABLE BRANCHING UNIT

BACKGROUND OF THE INVENTION

The present invention relates to a cable branching unit to be provided in the middle of a cable, such as a submarine cable, for branching electric or optical signals transmitted through the cable.

Cable faults, which may be caused in a submarine cable system, for example, have two modes. One is called an open mode, wherein a cable is broken at a fault point and a current flowing through the cable between two land stations is interrupted.

The other is called a short mode, wherein a cable is short-circuited to the ground due to immersion of seawater, for example, at a fault point, and a current from a land station is made to flow out at the fault point.

FIG. 3 is a block diagram illustrating an example of conventional cable branching unit 301 provided in a submarine cable system for branching a cable 41 connected to a first land station 111 into two cables 42 and 43 connected to a second and a third land station 112 and 113 respectively. The cable branching unit 301 comprises a driver circuit 21 connected between the cable 41 and the cable 43 and a relay 21-1 driven by the driver circuit 21. Other components for branching transmission signals, such as a branch amplifier, are omitted to in the drawings.

The relay 21-1 has a contact point 21-1a connected to the cable 41, a contact point 21-1b connected to the ground and a common terminal 21-1c connected to the cable 42. When the relay 21-1 is driven by he driver circuit 21, the common terminal 21-1c is connected to the contact point 21-1b, and the common terminal 21-1c is connected to the contact point 21-1a when the driver circuit 21 is disabled.

When the submarine cable system is working normally, a power current is supplied between the first and the third land station 111 and 113 flowing through the driver circuit 21, which drives the relay 21-1 to connect the cable 42 to the ground and another power current is supplied between the second land station 112 and the ground.

When an open mode fault is caused at a point of the cable 43 between the cable branching unit 301 and the land station 113, the power current flowing through the cable 43 is cut and the driver circuit 21 is disabled. Therefore, the common terminal 21-1c of the relay 21-1 is connected to the contact point 21-1a and composes a power supply circuit between the first land station 111 and the second land station 112 flowing through the cable branching unit 301.

Thus, signal transmission between the first and the second land station 111 and 112 can be maintained even when the open mode fault is caused on the cable 43 branching from the cable branching unit 301 towards the third land station 113.

However, when a short mode fault is caused at a point of the cable 43 branching from the conventional cable branching unit 301, the current from the first land station 111 is left flowing out from the fault point which is grounded. Therefore, signal transmission towards the cable branching unit 301 must be suspended until the fault point is repaired. This means suspension of the power supply to repeaters provided on the cable 41 between the first land station 111 and the cable branching unit 301, in a cable system wherein transmission signals are multiplexed on the same cable for supplying the power current, thereby resulting in a breakdown of the whole system.

SUMMARY OF THE INVENTION

Therefore, a primary object of the present invention is to provide a cable branching unit which enables the exchange signals through normal cables without suspending the power supply even when a short mode fault is caused in a cable branching from the cable branching unit.

In order to achieve the object, a cable branching unit according to an embodiment of the invention, for branching a cable connected to a first land station into a cable connected to a second land station and a cable connected to a third land station, comprises:

a control signal extracting means for extracting a control signal multiplexed among signals transmitted through the first cable from the first land station; and a short-circuiting means for short-circuiting, to a ground, one or both of the cable connected to the second land station and the cable connected to the third land station, according to the control signal extracted by the control signal extracting means.

The control signal extracting means may be a band-pass-filter for passing only a frequency component of a frequency which is assigned to the control signal. The short-circuitting means comprises:

a first driver circuit enabled by a current flowing through the cable connected to the third land station;

a first relay for connecting the cable connected to the second land station to the ground when the first driver circuit is enabled, and connecting the cable connected to the second land station to a node when the first driver circuit is disabled, the node being coupled to the cable connected to the first land station through the control signal extracting means and coupled to the cable connected to the third land station through the first driver circuit;

a second relay for short-circuiting the node to the ground when the second relay is driven; and a second driver circuit for driving the second relay when the frequency component of the frequency assigned to the control signal is extracted by the control signal extracting means.

When a plurality of cable branching units are to be provided in a cable system with certain intervals, a frequency band of the band-pass filter of any of the cable branching units is designed to be different from a frequency band of the band-pass-filter of any other of the cable branching units.

According to another embodiment of the invention, a cable branching unit for branching a cable including an optical cable connected to a first land station into a cable connected to a second land station and a cable connected to a third land station comprises:

an optical control signal extracting means for extracting an optical control signal multiplexed among optical signals transmitted through the optical cable from the first land station;

a short-circuiting means for short-circuiting, to a ground, one or both of the cable connected to the second land station and the cable connected to the third land station, according to the optical control signal extracted by the optical control signal extracting means.

The optical control signal extracting means comprises an optical band-pass-filter for passing only a wavelength component of a wave-lengt that is assigned to the optical control signal.

The short-circuitting means comprises:

a first driver circuit enabled by a current flowing through the cable connected to the third land station;

a first relay for connecting the cable connected to the second land station to the ground when the first driver circuit is enabled, and connecting the cable connected to the second land station to a node when the first driver circuit is disabled, the node being coupled to the cable connected to the first land station through the control signal extracting means and coupled to the cable connected to the third land station through the first driver circuit;

a second relay for short-circuitting the node to the ground when the second relay is driven; and a second driver circuit for driving the second relay when the wavelength component of the wavelength assigned to the optical control signal is extracted by the optical control signal extracting means.

When a plurality of cable branching units are to be provided in a cable system with a certain intervals, a wavelength band of the optical band-pass filter of any of the cable branching units is designed to be different from a wavelength band of the optical band-pass-filter of any other of the cable branching units.

Therefore, the signal exchange between the first and the second land station can be maintained with the power supply performed between the first land station and the ground, and the power supply performed between the second land station and the ground, even when a short mode fault is caused on the power supply cable branching from the cable branching unit.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
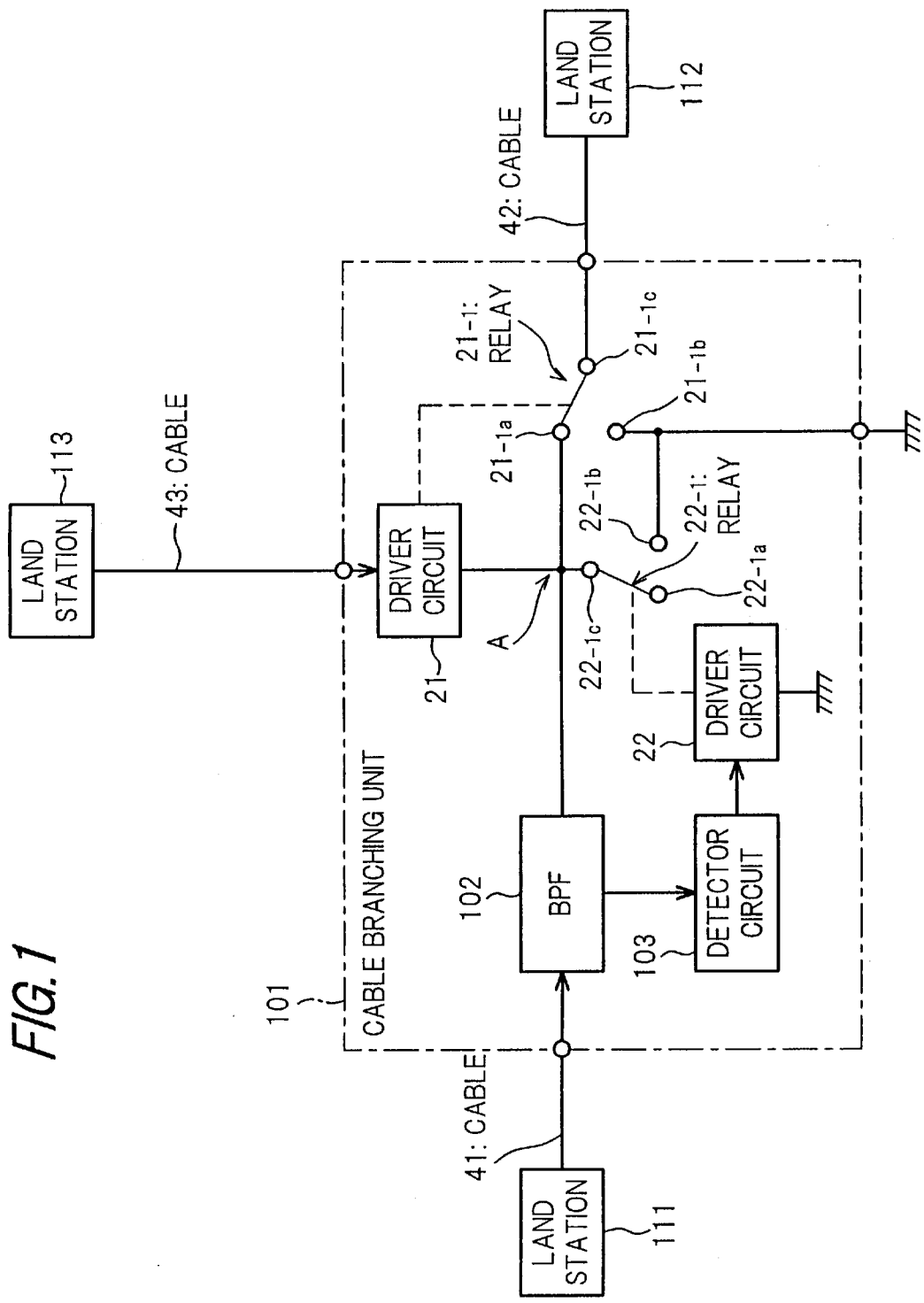
FIG. 1 is a block diagram illustrating a cable branching unit 101 according to a first embodiment of the invention.

FIG. 1 is a block diagram illustrating a cable branching unit 101 according to a first embodiment of the invention.

Figure 3:
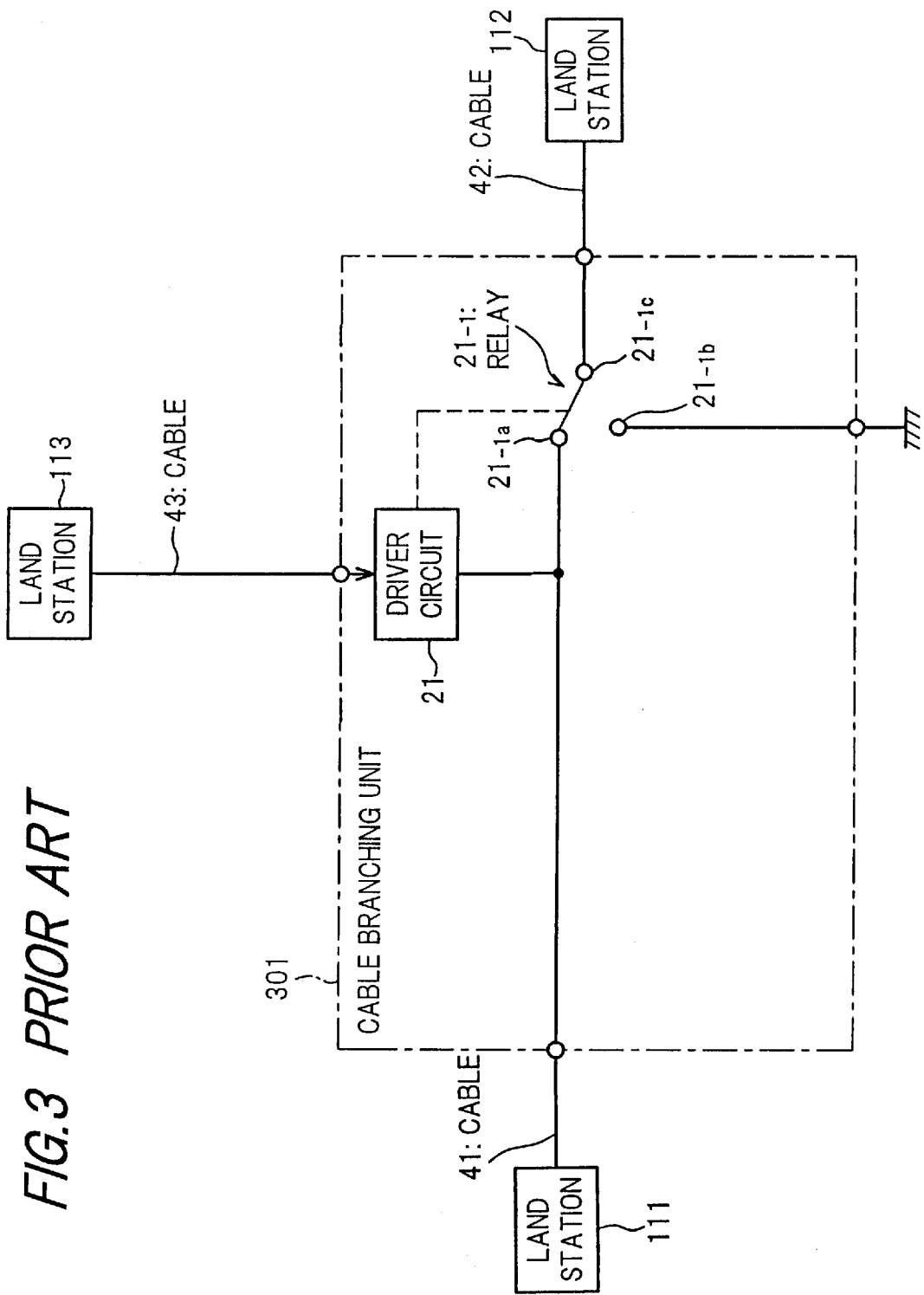
FIG. 3 is a block diagram illustrating an example of conventional cable branching unit 301.

Referring to FIG. 1, a first, a second and a third land station 111, 112 and 113 are connected with each other by way of the cable branching unit 101 through cables 41, 42 and 43, respectively, in the same way as the conventional cable branching unit 301 of FIG. 3.

In the cable system of FIG. 1, the first land station has a function to transmit a control signal multiplexed in the transmission signals through the cable 41.

The cable branching unit 101 comprises a BPF (Band-Pass-Filter) 102 connected between the cable 41 and a node A, a detector circuit 103, a second relay 22-1 and a second driver circuit 22, in addition to a first relay 21-1 and a first driver circuit 21 connected between the node A and the third land station 113 through the cable 43. The first relay 21-1 which is driven by the first driver circuit 21 has a first and a second contact point 21-1a and 21-1b connected to the node A and the ground, respectively, and a common terminal 21-1c connected to the second land station 112 through the cable 42. The first relay 21-1 and the first driver circuit 21 operate in the same way with the driver circuit 21 and the relay 21-1 of FIG. 3 and as duplicate descriptions are omitted.

The BPF 102 extracts the control signal from multiplex signals transmitted from the first land station 111. The control signal extracted by the BPF 102 is supplied to the detector circuit 103. The second driver circuit 22, which is connected between an output terminal of the detector circuit 103 and the ground, drives the second relay 22-1 when the control signal is detected by the detector circuit 103. The second relay 22-1 has a first and a second contact point 22-1a and 22-1b and a common terminal 22-1c. The common terminal 22-1c is connected to the node A and contacted to the second contact point 22-1b connected to the ground when the second relay 22-1 is driven by the second driver circuit 22.

When the cable system is working normally, a power current is supplied between the first land station 111 and the third land station 113 flowing through the first driver circuit 21, and another power current is supplied between the second land station 112 and the ground.

When an open mode fault is caused at a point of the cable 43, the first driver circuit is disabled and the common terminal 21-1c of the first relay 21-1 is connected to the node A through the first contact point 21-1a for enabling to supply of the power current between the first and the second land station 111 and 112, in the same way with the cable system of FIG. 3.

When a short mode fault is caused at a point of the cable 43 connected to the third land station 113, the power current from the first land station 111 is made to flow out from the fault point which is short-circuited to the ground.

Detecting the short mode fault, the first land station 111 transmits the control signal of a predetermined frequency, in the embodiment of FIG. 1, which is extracted by the BPF 102 of the cable branching unit 101 and detected by the detector circuit 103.

The second driver circuit 22 is enabled with the output of the detector circuit 103 when the control signal is detected, and the common terminal 22-1c of the second relay 22-1 is connected to the second contact point 22-1b. Therefore, the node A is connected to the ground through the second relay 22-1, enabling a supply of power current between the first land station 111 and the ground, regardless of the short mode fault caused on the cable 43.

As to the first relay 21-1, the common terminal 21-1c is to the first contact point 21-1a, as the first driver circuit 21 is disabled. However, the first contact point 21-1a of the first relay 21 is connected to the ground through the node A and the second relay 22-1. Therefore, the power supply between the second land station 112 and the ground is maintained as it is.

Thus, the signal exchange between the first and the second land station 111 and 112 can be maintained through the cables 41 and 42 with the power supply going between the first land station 111 and the ground, and another power supply going between the second land station 112 and the ground, even when a short mode fault is caused on the cable 43 branching from the cable branching unit 101 in the embodiment of FIG. 1.

In a cable system having more than one cable branching units, one of control signals having different frequencies may be assigned to each of the the cable branching units by preparing the frequency band of the BPF 102 of each of the cable branching units to correspond to the frequency of respective one of the control signals.

The control signal from the first land station may be transmitted through another cable than the cable used for supplying the power current.

Figure 2:
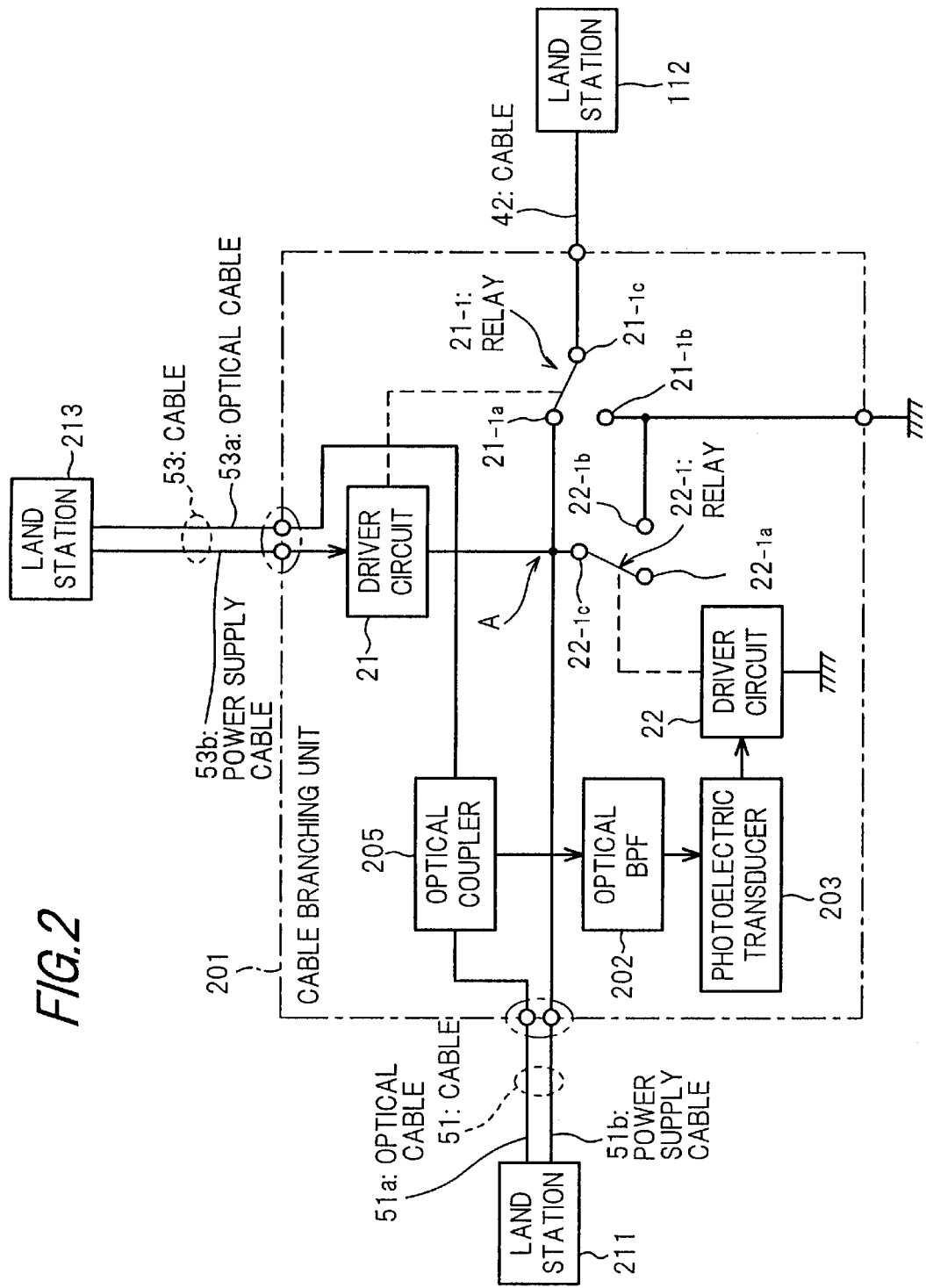
FIG. 2 is a block diagram illustrating a cable branching unit 201 according to a second embodiment of the invention.

FIG. 2 is a block diagram illustrating a cable branching unit 201 according to a second embodiment of the invention.

In the cable system of FIG. 2, a first land station 211 and a third land station 213 are connected to the cable branching unit 201 through a cable 51 and a cable 53, respectively. The cable 51 includes an optical cable 51a and a power supply cable 51b. The cable 53 includes an optical cable 53a and a power supply cable 53b.

The cable branching unit 201 has a similar configuration with the cable branching unit 101 of FIG. 1 except that an optical coupler 205, an optical BPF 202 and a photoelectric transducer 203 are used in place of the BPF 102 and the detector circuit 103 of FIG. 1.

The optical cable 51a and the optical cable 53a are connected by way of the optical coupler 205, whereby a part of optical signals is branched and supplied to the optical BPF 202.

The optical BPF 202 extracts a predetermined wavelength component to be supplied to the photoelectric transducer 203 from the optical signals supplied from the optical coupler 205.

The photoelectric transducer 203 generates an electric signal to be supplied to the second driver circuit 22 according to the optical signal supplied from the optical BPF 202.

The power supply cable 51a from the first land station 211 is connected to the node A, which is connected to the power supply cable 53b through the first driver circuit 21.

In the embodiment of FIG. 2, an optical control signal is transmitted from the first land station 211, when a short mode fault is caused at a point of the cable 53, being multiplexed in the optical signals transmitted through the optical cables 51a and 53a, whereof a part is branched towards the optical BPF 202. Only the wave-length component of the optical control signal is extracted by the optical BPF 202.

The second driver circuit 22 is enabled with the output of the photo-electric transducer 203 and the common terminal 22-1c of the second relay 22-1 is connected to the second contact point 22-1b, when the wave-length component of the optical control signal is supplied to the photoelectric transducer 203.

Therefore, the signal exchange between the first and the second land station 211 and 112 can be maintained with the power supply performed between the first land station 211 and the ground, and the power supply performed between the second land station 112 and the ground, even when a short mode fault is caused on the power supply cable 53b branching from the cable branching unit 201, in the same way with the embodiment of FIG. 1.

When more than one cable branching units are to be provided in a cable system according to the second embodiment, one of optical control signals having different wave-length may be assigned to each of the the cable branching units by preparing the wave-length band of the optical BPF 202 of a each of the cable branching units to correspond to the wave-length of respective one of the optical control signals, in the same way as with the first embodiment.

What is claimed is:

1. A cable branching unit for branching a cable connected to a first land station into a second cable connected to a second land station and a third cable connected to a third land station, the cable branching unit comprising: a filter which receives a plurality of signals from the first land station and extracts a control signal multiplexed among the signals; and a switch which short-circuits, to a ground, one or both of the first and second cables based on the control signal.

2. A cable branching unit as recited in claim 1, wherein the filter comprises a band-pass-filter which passes only a frequency component of a frequency which is assigned to the control signal.

3. A cable branching unit as recited in claim 1, wherein the switch comprises:

a first driver circuit enabled by a current flowing through the third cable connected to the third land station; and a first relay which connects the second cable connected to the second land station to the ground when the first driver circuit is enabled, and connects the second cable connected to the second land station to a node when the first driver circuit is disabled, the node being coupled to the first cable connected to the first land station through the filter and coupled to the third cable connected to the third land station through the first driver circuit.

4. A cable branching unit as recited in claim 3, wherein the switch further comprises a second relay which short circuits the node to the ground when the second relay is driven.

5. A cable branching unit as recited in claim 4, further comprising a second driver circuit which drives the second relay when the frequency component of the frequency assigned to the control signal is extracted by the filter.

6. A cable system for transmitting a signal from a transmitting land station to a receiving land station, said cable system including a plurality of cable branching units, each cable branching unit for branching a cable connected to a respective first land station into a second cable connected to a respective second land station and a third cable connected to a respective third land station, each cable branching unit comprising:

a filter which receives a plurality of signals from the first land station and extracts a control signal multiplexed among the signals; and a switch which short-circuits, to a ground, one or both of the first and second cables based on the control signal;

wherein a frequency band of each filter of a respective cable branching unit is designed to be different from a frequency band of a filter corresponding to any other cable branching unit.

7. A cable branching unit for branching a cable including a first optical cable connected to a first land station into a second optical cable connected to a second land station and a third optical cable connected to a third land station, the cable branching unit comprising:

an optical filter which receives a plurality of optical signals from the first land station and extracts an optical control signal multiplexed among the optical signals;

a switch which short-circuits to a ground, one or both of the first and second optical cables based on the optical control signal.

8. A cable branching unit as recited in claim 7, wherein the optical filter comprises an optical band-pass-filter which passes only a wavelength component of a wavelength that is assigned to the optical control signal.

9. A cable branching unit as recited in claim 7, wherein the switch comprises:

a first driver circuit enabled by a current flowing through the third cable connected to the third land station; and a first relay which connects the second cable connected to the second land station to the ground when the first driver circuit is enabled, and connects the second cable connected to the second land station to a node when the first driver circuit is disabled, the node being coupled to an electric cable included in the first cable connected to the first land station and coupled to an electric cable included in the third cable connected to the third land station through the first driver circuit.

10. A cable branching unit as recited in claim 9, wherein the switch further comprises a second relay which short-circuits the node to the ground when the second relay is driven.

11. A cable branching unit as recited in claim 10, further comprising a second driver circuit which drives the second relay when the wavelength component of the wavelength assigned to the optical control signal is extracted by the optical filter.

12. A cable system for transmitting a signal from a transmitting land station to a receiving land station, said cable system including a plurality of cable branching units, each cable branching unit for branching a cable including a first optical cable connected to a first land station into a second optical cable connected to a second land station and a third optical cable connected to a third land station, each cable branching unit comprising:

an optical filter which receives a plurality of optical signals from the first land station and extracts an optical control signal multiplexed among the optical signals; and a switch which short-circuits to a ground, one or both of the first and second optical cables based on the optical control signal;

wherein a wavelength band of each optical filter of a respective cable branching unit is designed to be different from a wavelength band of an optical filter corresponding to any other cable branching unit.

13. A plurality of cable branching units provided in a cable system, each cable branching unit having a configuration as recited in claim 3, wherein a frequency band of each band-pass-filter of a respective cable branching unit is designed to be different from a frequency band of the a band-pass-filter corresponding to any other cable branching unit.

14. A plurality of cable branching units provided in a cable system, each cable branching unit having a configuration as recited in claim 4, wherein a frequency band of each band-pass-filter of a respective cable branching unit is designed to be different from a frequency band of a band-pass-filter corresponding to any other cable branching unit.

15. A plurality of cable branching units provided in a cable system, each cable branching unit having a configuration as recited in claim 5, wherein a frequency band of each band-pass-filter of a respective cable branching unit is designed to be different from a frequency band of a band-pass-filter corresponding to any other cable branching unit.

16. A plurality of cable branching units provided in a cable system, each cable branching unit having a configuration as recited in claim 9, wherein a wavelength band of each optical band-pass filter of a respective cable branching unit is designed to be different from a wavelength band of an optical band-pass-filter corresponding to any other cable branching unit.

17. A plurality of cable branching units provided in a cable system, each cable branching unit having a configuration as recited in claim 10, wherein a wavelength band of each optical band-pass filter of a respective cable branching unit is designed to be different from a wavelength band of an optical band-pass-filter corresponding to any other cable branching unit.

18. A plurality of cable branching units provided in a cable system, each cable branching unit having a configuration as recited in claim 11, wherein a wavelength band of each optical band-pass filter of a respective cable branching unit is designed to be different from a wavelength band of an optical band-pass-filter corresponding to any other cable branching unit.

19. A cable branching unit as recited in claim 6, wherein the filter comprises a band-pass-filter which passes only a frequency component of a frequency which is assigned to the control signal.

20. A cable branching unit as recited in claim 6, wherein the switch comprises:

a first driver circuit enabled by a current flowing through the third cable connected to the third land station; and a first relay which connects the second cable connected to the second land station to the ground when the first driver circuit is enabled, and connects the second cable connected to the second land station to a node when the first driver circuit is disabled, the node being coupled to the first cable connected to the first land station through the filter and coupled to the third cable connected to the third land station through the first driver circuit.

21. A cable branching unit as recited in claim 20, wherein the switch further comprises a second relay which short circuits the node to the ground when the second relay is driven.

22. A cable branching unit as recited in claim 21, further comprising a second driver circuit which drives the second relay when the frequency component of the frequency assigned to the control signal is extracted by the filter.

23. A branching unit as recited in claim 12, wherein the optical filter comprises an optical band-pass-filter which passes only a wavelength component of a wavelength that is assigned to the optical control signal.

24. A cable branching unit as recited in claim 12, wherein the switch comprises:

a first driver circuit enabled by a current flowing through the third cable connected to the third land station; and a first relay which connects the second cable connected to the second land station to the ground when the first driver circuit is enabled, and connects the second cable connected to the second land station to a node when the first driver circuit is disabled, the node being coupled to an electric cable included in the first cable connected to the first land station and coupled to an electric cable included in the third cable connected to the third land station through the first driver circuit.

25. A cable branching unit as recited in claim 24, wherein the switch further comprises a second relay which short-circuits the node to the ground when the second relay is driven.

26. A cable branching unit as recited in claim 25, further comprising a second driver circuit which drives the second relay when the wavelength component of the wavelength assigned to the optical control signal is extracted by the optical filter.

* * * * *